Figure 1:
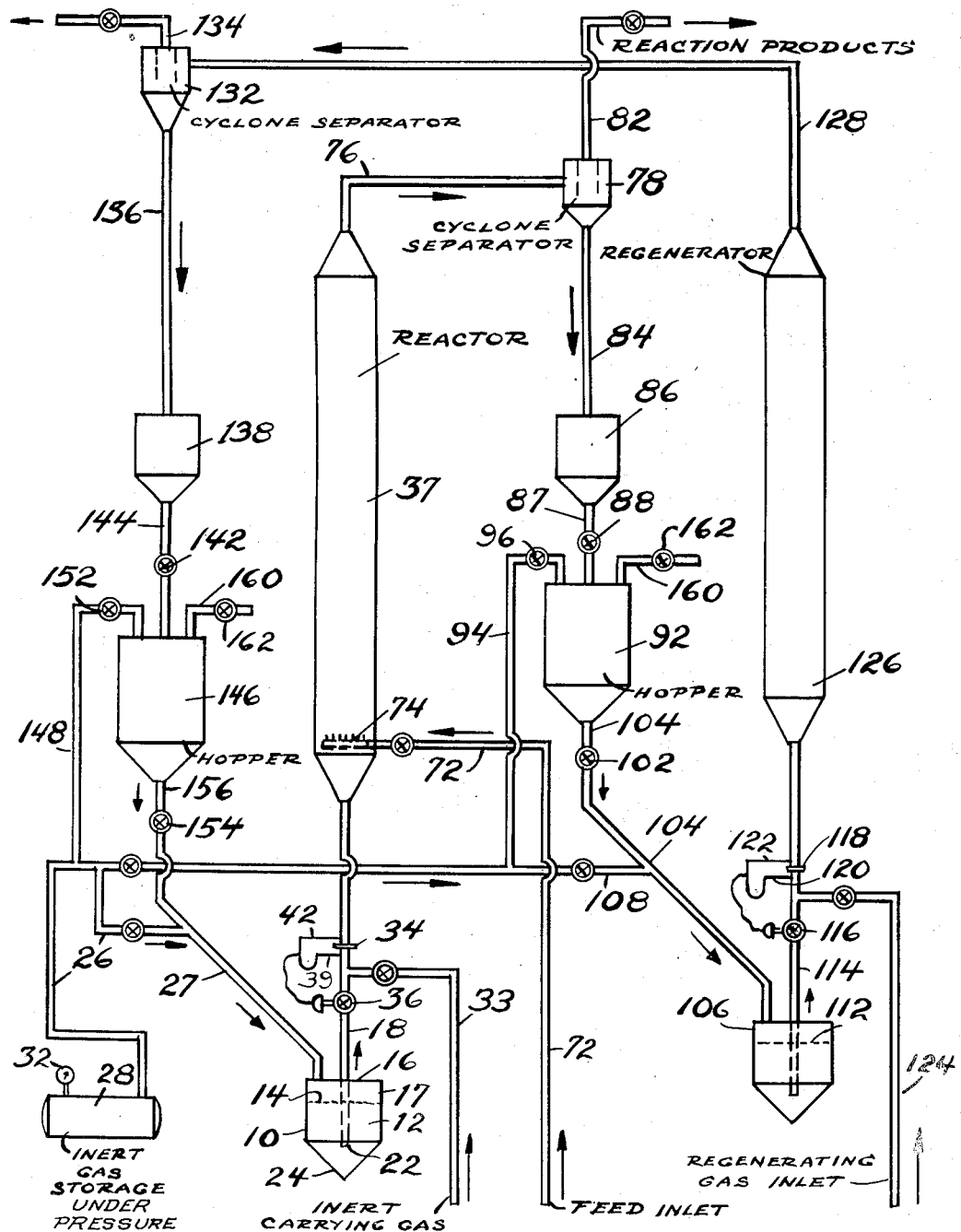

Jan. 8, 1946.  E. D. REEVES  2,392,765
METHOD OF CONTROLLING FLOW OF POWDER
Filed Oct. 24, 1942  2 Sheets-Sheet 1

Edward D. Reeves Inventor
By L. Young Attorney

Patented Jan. 8, 1946

2,392,765

UNITED STATES PATENT OFFICE 2,392,765

METHOD OF CONTROLLING FLOW OF POWDER

Edward D. Reeves, Cranford, N. J., assignor to Standard Oil Development Company, a corporation of Delaware Application October 24, 1942, Serial No. 463,174

9 Claims. (Cl. 196—52)

This invention relates to methods of controlling the flow of powdered material from a hopper or the like and more particularly relates to controlling the amount of powdered catalyst being introduced into a catalytic conversion process.

My invention is especially adapted for use in continuously carrying out catalytic reactions involving powdered catalyst or contact materials such as in the conversion of hydrocarbons. In these catalytic reactions it is desired to feed the powdered material into a reaction zone and it is essential that the powdered material enter the reaction zone at a regulated and predetermined rate for carrying out the catalytic reaction in the best manner.

According to my invention, powdered material is fed into an enclosed vessel or container which has a pipe or tube extending through the top of the vessel and to a point near the bottom of the vessel. A space is left above the powdered material and the powdered material is maintained under a substantially constant pressure. With the pipe or tube open, powdered material will be forced upwardly through the tube and out of the vessel. A control valve is placed in the pipe for controlling the flow of powdered material through the pipe.

It is difficult to handle powdered materials and if the pipe instead of extending upwardly from near the bottom of the vessel were placed as a bottom outlet from the vessel the powdered material would tend to bridge over the outlet and increasing the pressure would only strengthen rather than break the bridge so that the flow of powdered material is further impeded.

According to my invention, a restricted orifice is placed in the pipe preferably above the vessel or hopper and above the control valve. Inert carrying gas at a constant rate of flow is introduced into the pipe below the orifice and the mixture of gas and powdered material passing through the orifice produces a certain pressure drop. With a substantially constant inert gas flow and with a constant pressure on the vessel the concentration of the powdered material in the outlet pipe will remain substantially constant. A desired concentration of powdered material in the gas will represent a certain pressure drop across the orifice and a control device is used for the valve to maintain the desired pressure drop across the orifice. If for any reason, variations in the pressure drop across the orifice occur, they are compensated for by the control device which changes the position of the valve controlling the outlet for the flow of powdered material from the vessel. By maintaining the pressure drop across the orifice substantially constant and maintaining the gas pressure substantially constant on the vessel or container, the flow of powdered material will be substantially constant from the vessel and will be delivered to any point desired.

My invention further includes mixing reactant or reactants with powdered contact material in regulated amounts in a reaction vessel, separating reaction products in vapor form from dry spent catalyst particles and collecting the separated catalyst particles in a hopper. The separated catalyst is then introduced into a lock hopper where the catalyst is put under pressure and then introduced into a closed container of the type above referred to from which it is removed by a pipe extending through the top of the container and to a point near the bottom of the container.

Controlled amounts of spent catalyst with regenerating gas are passed to a regeneration zone and the mixture leaving this zone is separated into regenerated catalyst and regeneration gases. The regenerated catalyst is then passed to to a closed container of the type above referred to wherein it is maintained under a substantially constant pressure. Controlled amounts of regenerated catalyst are passed to the reaction zone or vessel as above described.

Figure 2:
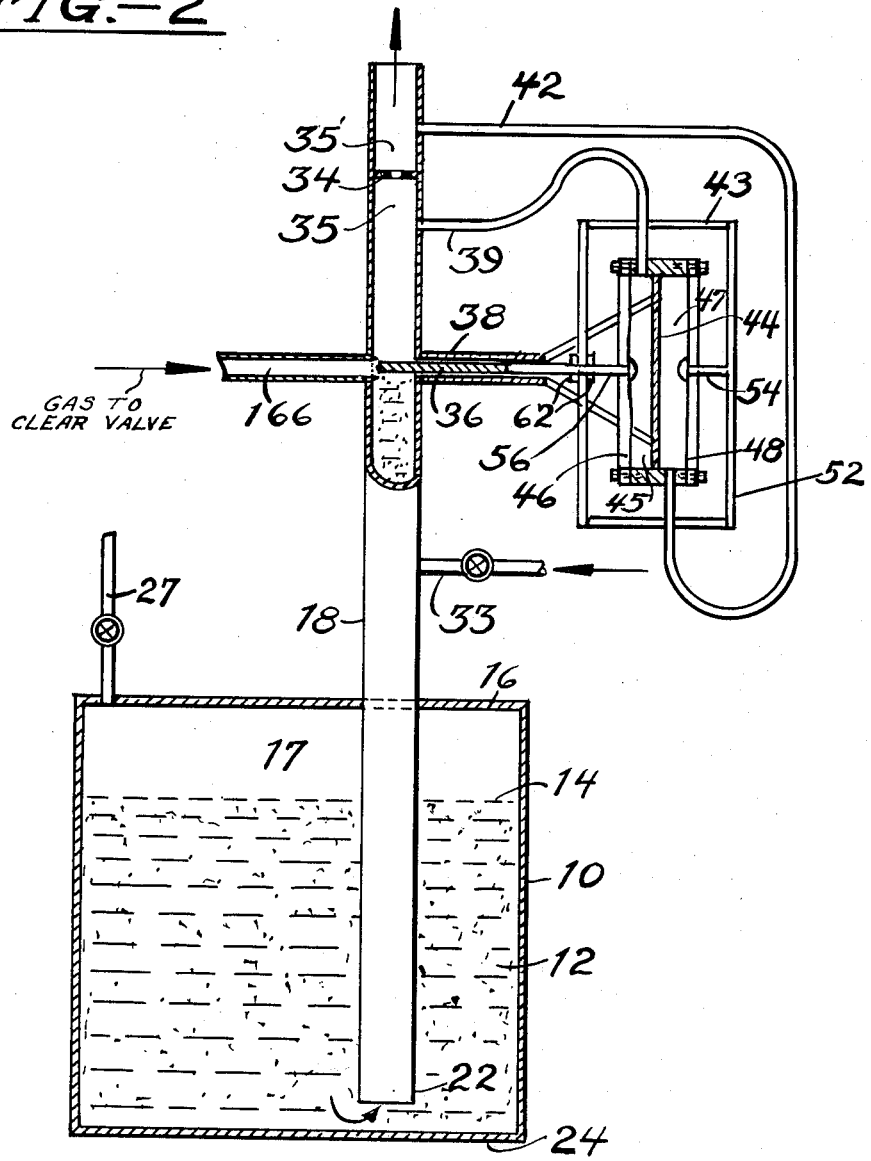

In the drawings:

Fig. 1 represents one form of apparatus adapted for carrying out my invention; and Fig. 2 represents a detail of the control valve and closed container for the catalyst.

Referring now to the drawings, the reference character 10 designates an enclosed vessel or container containing finely divided or powdered material 12. If the material to be handled is catalytic or contacting material such as acid treated bentonite clays, the powdered material is of a size to pass through 200 to 400 standard mesh or finer.

As shown in the drawings, the powdered material has a level 14 which is below the top 16 of the vessel or container to leave a space 17 between the top of the powdered material and the top of the container. Extending through the top 16 of the container 10 is a vertical pipe or tube 18. The tube 18 extends downward through the powdered material 12 and has its lower end 22 spaced upwardly from the bottom 24 of the vessel or container 10 to permit withdrawal of the powdered material from the vessel. A line 26 is provided leading from a storage tank 28 for introducing gas under pressure into line 27 and then into the space 17 above the level 14 of the powdered material in the vessel or container 10 to maintain the powdered material under substantially constant pressure. A back pressure regulator may be provided in line 26. Preferably, a pressure gauge 32 is provided for indicating the pressure existing within the tank 28.

If gas under pressure is introduced into the top of the vessel 10 and if the tube is open, powdered material will be forced upwardly through the tube 18 and out of the container 10. In my invention it is essential that the flow from the container into the tube is upwardly. If the container 10 were provided with a bottom outlet rather than as shown in the drawings there would be a tendency for the powdered material to bridge over the outlet and increasing the pressure in the container would only pack the material around the outlet and increase the strength of the bridge. With my arrangement, the flow of the powdered material from the container is uninterrupted and there is no bridging around the lower end 22 of the tube 18. For example, using powdered acid treated bentonite clays having a fineness of about 200 to 400 standard mesh or finer, it is desirable to have a gauge pressure of about 15 lbs./sq. in. in the space 17 above the powdered material in the container 10.

The powdered material flows upwardly through the tube 18 as a relatively heavy suspension of solid particles in gas. An inert carrying gas such as steam is introduced into line 18 through line 33 at a substantially constant rate of flow to make a lighter suspension. At its upper portion above the vessel or container 10 the tube 18 is provided with a restricted orifice 34 arranged above inert gas inlet 33. The suspension of powdered material and gas passes through the orifice 34 and due to the orifice there is a pressure drop and the pressure on the upstream side 35 of the orifice 34 is greater than the pressure on the downstream side 35' of the orifice (see Fig. 2).

The amount of inert carrying gas passed through line 33 is maintained at a constant figure. In passing through orifice 34 the flow of inert carrying gas sets up a definite pressure drop and if powdered catalyst is added to the gas stream, the pressure drop through orifice 34 at a constant gas velocity will be directly proportional to the catalyst concentration in the gas stream or to the pounds of catalyst per hour passing through orifice 34. This being the case, it is readily calculated that pressure drop through orifice 34 would represent a definite flow of catalyst through control valve 36 and then through orifice 34. Control valve 36 is then set to open and close as the pressure drop through orifice 34 exceeds or fails to reach the desired pressure drop.

When the pressure drop across orifice 34 is too low, the valve opens and allows catalyst to flow from vessel 10 up through the line through valve 36 and into the gas stream from line 33, through the orifice and into the reaction vessel 37. Line 33 may discharge into line 18 at a point between the control valve 36 and the orifice plate 34 as shown in Fig. 1, or it may discharge into line 18 at a point below the control valve as shown in Fig. 2. The valve is of the "Stabilog" type which seeks a throttling position so that it will adjust itself to maintain the desired pressure drop across orifice 34 and consequently will maintain a constant flow of catalyst from vessel 10 to reactor or reaction zone 37.

In Fig. 2 I have diagrammatically shown a control valve which is not intended as a showing of the "Stabilog" type but which merely is used as representing one form of control valve. The valve 36 is shown as a slide valve which is received in casing 38. The control means presently to be described moves the slide valve to permit either more or less powdered material to pass through the tube 18. A line 39 communicates with the tube 18 on the upstream side 35 of orifice 34 and another tube 42 communicates with the tube 18 on the downstream side 35' of the orifice 34. As above pointed out, there will be a pressure difference on the opposite side of the orifice and the different pressures are transmitted to a control means generally designated 43 for controlling the position of the slide valve 36. The control means 43 is provided with a fixed partition 44 which is fixedly attached to the casing 38 of the slide valve 36. The tube 39 communicates with enclosed space 45 on one side of the partition 44, the space 45 being bounded on the other side by a flexible movable diaphragm 46.

Tube 42 communicates with enclosed space 47 on the other side of the fixed partition 44 and this space is bounded by another flexible movable diaphragm 48. The diaphragm 48 is connected to a movable frame 52 by means of a pin 54 fixedly secured at one end to diaphragm 48 and at its other end to the movable member 52. The other diaphragm 46 is connected by plunger 56 to the control valve 36. Intermediate its ends the plunger 56 is fixedly connected to the movable member 52 by means of projections 62.

From the above description, it will be seen that the different pressures on opposite sides of the orifice 34 are transmitted to opposite sides of the fixed partition 44 in the control means 43. The control device is selected to deliver a certain amount of powdered material from the container 10 and through the tube 18 to the reaction zone 37. With this amount of powdered material passing through the orifice 34 a certain pressure drop will be obtained and the valve 36 is moved to the correct position for maintaining this pressure drop. With this setting, if the concentration of the powdered material in the gas increases, the pressure drop across the orifice 34 will be increased and the pressure exerted on diaphragm 46 through tube 39 will be increased over the pressure existing in space 47 which communicates with the downstream side of the orifice through tube 42 and as a result diaphragm 46 will be moved away from the fixed partition 44 and the valve 36 will be moved toward closed position.

If the opposite condition arises and the concentration of the powdered material in the gas falls, the pressure in the space 45 will be decreased and the valve 36 will be moved to the right as shown in the drawings and toward open position to permit more powdered material to pass through the tube 18.

The powdered catalyst is introduced into the bottom of the reaction zone 37 where it is mixed with a hydrocarbon vapor or gas introduced into the bottom of reaction zone 37 through line 72 provided with openings 74 at its inner end within zone 37. For a given feed rate of hydrocarbon to be converted, the desired amount of catalyst is introduced by means of control valve 36 as above described. The heated hydrocarbon and hot catalyst are maintained in the reaction zone 37 for the desired time to effect the desired extent of conversion.

The hydrocarbon and catalyst pass upwardly in zone 37 and leave through line 76 at the top of the zone 37. The mixture of reaction products and catalyst is passed to a separating means 78 for separating vaporous reaction products from dry catalyst particles. While a single cyclone separator has been shown in the drawings as a separating means, it is to be understood that one or more cyclone separators may be used and in addition to the cyclone separators a Cottrell precipitator or bag filter or the like may be used to effect a more complete separation of the solid particles from the reaction products.

The reaction products in vapor form leave the top of the separating means 78 through line 82 and are passed to suitable equipment for separating desired constituents therefrom. The separated solid particles collect in the bottom of the separating means 78 and are withdrawn therefrom through line 84 and passed to a lock hopper 86.

When a sufficient amount of powdered material is collected in the lock hopper 86, the powdered material is discharged through line 87 with the valve 88 open and into a second lock hopper 92. When the lock hopper 86 is emptied, the valve 88 is closed and fluid under pressure is introduced into the lock hopper 92 through line 94 having a valve 96. Line 94 communicates with line 26 leading from the inert gas storage tank 28. When a sufficient pressure is attained in lock hopper 92, valve 96 in line 94 is closed and valve 102 in discharge line 104 is opened and the powdered material is introduced under pressure into a closed container 106 which is similar to closed container 10 above described.

When the valve 102 associated with lock hopper 92 is closed, fluid under pressure is preferably introduced through line 104 by means of line 108 which communicates with the storage tank 28. In this way the powdered material in the closed container 106 is maintained under a substantially constant pressure. The level of powdered material is shown at 112 in the container 106. A tube 114 extends through the top of the closed container to a point near the bottom of the container. The tube 114 functions in the same manner as tube 18 described in connection with the container 10 hereinbefore. Tube or line 114 is provided with a control valve 116, and an orifice 118 the same as described in connection with tube 18. Lines 120 and 122 arranged on opposite sides of the orifice 118 are similar to lines 39 and 42 above described in connection with tube 18.

The catalyst particles which are separated from reaction products are spent or partially spent and in most cases can be regenerated by burning off deposits with air. Instead of using an inert carrying gas for the suspension passing through line 114, a regenerating gas such as air or other gas containing free oxygen is introduced by line 124 into the suspension passing through line 114, line 124 discharging above control valve 116 but below the orifice 118. The density of the suspension passing through line 114 varies with the amount of catalyst or powdered material suspended in the gas and different pressure drops will be obtained on passing suspensions having different densities through the orifice 118 in line 114.

For a desired ratio of spent catalyst particles to regenerating gas the pressure drop of such a suspension can be obtained and the control valve 116 is so adjusted to maintain the desired ratio of spent catalyst to regenerating gas. Variations from the desired ratio are compensated for by the control valve responding to the difference in pressure drop through the orifice 118. The regenerating gas is introduced into line 114 through line 124.

The mixture of spent catalyst particles and regeneration gas is passed upwardly through a regeneration zone 126 wherein the particles are maintained for the desired time to effect the desired extent of regeneration. The regenerated catalyst particles and regeneration gases pass overhead through line 128 to a separating means 132 wherein regenerated catalyst particles are separated from regeneration gases. While a single cyclone separator has been shown, it is to be understood that a plurality of cyclone separators may be used and/or an electrical precipitator, bag filter, oil spray, etc., for removing additional amounts of entrained solid particles from the regeneration gases.

The regeneration gases pass overhead through line 134 and the solid regenerated particles are withdrawn from the bottom of the separating means through line 136. The regenerated catalyst particles are introduced into a lock hopper 138 and when a sufficient amount of regenerated catalyst or solid particles has accumulated in the hopper 138, valve 142 in discharge line 144 is opened and regenerated catalyst is introduced into a second lock hopper 146.

When the first lock hopper 138 is substantially empty, the valve 142 is closed and fluid under pressure is introduced into the second lock hopper 146 to place the contents thereof under superatmospheric pressure. Fluid under pressure is introduced through line 148 having a valve 152. Line 148 communicates with line 26 leading from the storage tank 28.

When the desired pressure is reached in the second lock hopper 146, valve 152 is closed and a valve 154 in discharge line 156 is opened to permit discharge of the regenerated solid particles through line 27 into the closed container 10 hereinbefore described. When the lock hopper 146 is empty, the valve 154 is closed. In order to maintain the powdered material in container 10 under a substantially constant superatmospheric pressure fluid under pressure is passed through line 26 and line 27 into the top of the container 10.

Each of the lock hoppers 92 and 146 is provided with a line 160 provided with a safety valve 162 for preventing pressures in excess of those desired in these lock hoppers.

Adjacent the valve 36, the tube 18 is provided with a tube 166 (Fig. 2) for introducing gas into the tube 18 to prevent the powdered material from collecting on the valve 36 or associated parts. The velocity of this gas passing through line 166 is maintained substantially constant and may be of the order of about 10 feet per second.

The gas introduced through line 26 and line 166 is any suitable gas which does not react with the powdered material or which is not detrimental in the catalytic reaction. For example, in catalytic reactions such as catalytic conversions of hydrocarbons, the gas may be an inert gas such as normally gaseous hydrocarbons or carbon dioxide. My invention may be used for catalytic cracking of hydrocarbons, catalytic dehydrogenation, polymerization, etc.

In the dehydrogenation of normal butane according to my invention, normal butane is fed into dehydrogenation reactor 37 through line 72 at a constant rate of flow. The ratio of catalyst to butane is about 0.1 lb. of catalyst per cubic foot of gaseous butane. The rate of flow of inert gas through line 33 is kept constant at about 20 feet per second. For the desired rate of flow of catalyst to reaction vessel 37, the control valve 36 is set to give the desired pressure drop through orifice 34 and variations are compensated for by the control valve. The gauge pressure in container 10 is about 15 lbs. per square inch.

The dehydrogenation reactor is maintained at a temperature of 1100° F. and is of such a diameter that the net upward gas flow through the reactor is at a velocity of about 2 feet per second. The height of the reactor 37 is about 20 feet so that the gas contact time within the reactor is approximately 10 seconds. Under these conditions 40% of the normal butane feed is converted and a yield of approximately 29% of butenes is obtained for a selectivity or ultimate yield on a recycle basis of approximately 73%. Catalyst and reacted products from reactor 37 then pass to cyclone 78 where the dehydrogenated products are separated and sent to purifying equipment.

Spent catalyst is then passed from cyclone 78 to the hopper system 86, 92 and into vessel 106 from which the catalyst is then fed continuously into regenerator 126 in a manner similar to that described for the reactor itself.

In this case, however, the actual reacting or regenerating gas, which is air, is fed into the line directly above valve 116 to line 114 and the reacting gas itself passes through orifice 118 and serves as the actuating gas for the orifice and control of valve 116. The catalyst, which is a chromium oxide-alumina type catalyst of about 200 to 400 standard mesh or finer, is regenerated in vessel 126 at a temperature of approximately 1050° F. and a contact time of about 10 seconds with an upward gas velocity in the regenerator of approximately 2 feet per second. After being regenerated, the catalyst and the spent gases pass to cyclone 132 where regenerated catalyst is separated and again returned to lock hoppers 138 and 146 for return to container 10 and for recycling to the reaction zone 37.

The control valve 116 is set to control the ratio of spent catalyst to regenerating gas and variations from the desired pressure drop across orifice 118 are compensated for by the control valve 116. The gauge pressure in container 106 holding the spent catalyst is about 15 lbs. per square inch. The rate of flow of regenerating gas fed through line 124 is kept substantially constant at the desired figure to give a velocity of about 20 feet per second in the line leading to orifice 118.

It will be seen that my method of controlling catalyst flow outlined above provides a steady, continuous flow of powdered catalyst to both the reactor 37 and the regenerator 126 at any predetermined rate. This is essential in carrying out continuous opertion where the ratio of catalyst to reactant is critical as it is in the dehydrogenation of butane. The arrangement of lock hoppers and control equipment also provides a positive seal to prevent backing up of gases from the reactor to the regenerator or vice versa, thus avoiding danger of explosion and fouling of the various streams.

While I have shown one form of my invention, it is to be understood that this is by way of example only and various changes and modifications may be made without departing from the spirit of my invention.

I claim:

1. A method for controlling the flow of powdered material from a container to a zone in which the powdered material is utilized, which comprises placing the powdered material under a substantially constant superatmospheric pressure and forcing the powdered material upwardly through a tube extending through the top of said container to near the bottom thereof, adding a gasiform fluid at a substantially constant rate to the upwardly moving powdered material, and using the pressure drop across a restricted orifice in said tube to actuate a control valve ahead of said orifice in said tube for maintaining the flow of powdered material from said container at a substantially constant rate.

2. A method for maintaining the flow of powdered material, from a container to a zone in which the powdered material is utilized, substantially constant, which comprises placing powdered material under a substantially constant superatmospheric pressure in a container, forcing powdered material as a gaseous suspension from the container through a tube extending upwardly from the body of powdered material in said container and having its lower end opening beneath the surface of said powdered material, adding a gas to the powdered material in the tube at a substantially constant rate, passing the resulting mixture through a restricted orifice in said tube to produce a pressure drop which varies with the amount of powdered material contained in the mixture flowing through said tube and using variations in the pressure drop to actuate a control valve in said tube ahead of said restricted orifice to maintain the rate of flow of powdered material through said tube substantially constant.

3. A method according to claim 2 wherein the resulting mixture of powdered material and gas is introduced into a reaction vessel where it is mixed with a gaseous or vaporous reactant introduced at a substantially constant rate of flow and the desired reaction carried out.

4. A method according to claim 2 wherein the powdered material comprises hot regenerated catalyst which is introduced into said container from a pressure hopper.

5. A process according to claim 2 wherein the added gas comprises a regenerating gas and the powdered material comprises fouled catalyst and the mixture is introduced into a regeneration zone to reactivate the catalyst.

6. A process according to claim 2 wherein the added gas comprises a regenerating gas and the powdered material comprises fouled catalyst and the mixture is introduced into a regeneration zone to reactivate the catalyst and the regenerated catalyst is separated from regeneration gases and introduced into a lock hopper from which it is passed under superatmospheric pressure to said container.

7. A process of catalytically converting hydrocarbons, which comprises passing powdered catalyst from a lock hopper wherein the catalyst is maintained under superatmospheric pressure to a closed container wherein the catalyst is under a substantially constant superatmospheric pressure, forcing the catalyst from said container through a tube extending upwardly from the body of catalyst in said container, said tube having its lower end inserted beneath the surface of said body of catalyst, passing the catalyst, as a suspension to which gas is added at a substantially constant rate, through a restriction in said tube to produce a known pressure drop for actuating a control valve to maintain the flow of catalyst from said container at a substantially constant rate, mixing a hydrocarbon with said catalyst in a reaction zone and passing this mixture under reaction conditions through said reaction zone, separating vaporous reaction products from dry spent catalyst, passing the spent catalyst to a second lock hopper for placing the spent catalyst under superatmospheric pressure, passing the spent catalyst to a second closed container, removing the spent catalyst therefrom, mixing regenerating gas with the spent catalyst to form a mixture, passing said mixture to a regenerating zone, controlling the amount of spent catalyst passing to the regeneration zone, regenerating the spent catalyst, separating hot regenerated catalyst from regeneration gases, and returning the regenerated catalyst to said first lock hopper.

8. A method for maintaining the flow of powdered material, from a container to a zone in which the powdered material is utilized, substantially constant, which comprises placing powdered material under a substantially constant superatmospheric pressure in a container, forcing powdered material as a suspension to which gas is added at a substantially constant rate, from the container through a tube extending upwardly from the body of powdered material in said container and having its lower end opening beneath the surface of said powdered material, passing the powdered material through a restriction in said tube to produce a pressure drop which varies with variations in the density of the powdered material suspension passing therethrough and using variations in the pressure drop to actuate a control valve ahead of said restriction in said tube to maintain the rate of flow of powdered material through said tube substantially constant.

9. A method according to claim 7 wherein gas under pressure is introduced adjacent said valve to prevent the accumulation of powdered material on said valve.

EDWARD D. REEVES.